US012534162B1

(12) United States Patent
Burns

(10) Patent No.: US 12,534,162 B1
(45) Date of Patent: Jan. 27, 2026

(54) PORTABLE LADDER WITH STANDOFFS

(71) Applicant: Michael Paul Burns, Waunakee, WI (US)

(72) Inventor: Michael Paul Burns, Waunakee, WI (US)

( * ) Notice: Subject to any disclaimer, the term of this patent is extended or adjusted under 35 U.S.C. 154(b) by 886 days.

(21) Appl. No.: 17/714,949

(22) Filed: Apr. 6, 2022

Related U.S. Application Data

(60) Provisional application No. 63/226,681, filed on Jul. 28, 2021, provisional application No. 63/171,962, filed on Apr. 7, 2021.

(51) Int. Cl.
*B63B 27/14* (2006.01)
*E06C 1/52* (2006.01)
*E06C 5/26* (2006.01)

(52) U.S. Cl.
CPC .............. *B63B 27/146* (2013.01); *E06C 1/52* (2013.01); *E06C 5/26* (2013.01)

(58) Field of Classification Search
CPC ......... B63B 27/146; B63B 27/14; E06C 1/52; E06C 1/56; E06C 1/383; E06C 5/26; E06C 1/525
See application file for complete search history.

(56) References Cited

U.S. PATENT DOCUMENTS 149,328 A * 4/1874 Mulford
312,354 A * 2/1885 Ivester
443,061 A * 12/1890 Wass
588,389 A * 8/1897 Boemmel
836,432 A * 11/1906 Bryant
878,695 A * 2/1908 Walter
2,202,597 A * 5/1940 Myerstuen ............ B63B 27/146 182/198
2,887,261 A * 5/1959 McGuire ................... E06C 1/56 182/198
3,056,466 A * 10/1962 Wall, Jr. ..................... E06C 1/34 182/214
3,415,341 A * 12/1968 Hostetler .................. E06C 1/56 182/198
3,774,720 A * 11/1973 Hovey .................. B63B 27/146 182/208
4,852,688 A * 8/1989 Strohmeyer, Sr. ........ E06C 1/56 182/199
5,113,782 A * 5/1992 McCarty ............... B63B 27/146 114/364
5,540,178 A * 7/1996 Damron .................. B63B 27/14 441/39
5,971,105 A * 10/1999 Jacobson .................. E06C 1/56 182/198

(Continued)

*Primary Examiner* — David E Martinez
(74) *Attorney, Agent, or Firm* — Brannen Law Office, LLC

(57) ABSTRACT

The present invention relates to a portable ladder with standoffs. The ladder has several steps, each having a tread, two elbows and two standoffs. The user uses the treads to ascend the ladder. The standoffs have distal ends that contact the boat for stability. A tread cable assembly secures the ladder to the boat and supports the treads in a selected maximum spaced relationship. Two standoff cable assemblies are also provided. Each standoff cable assembly has sections that supports the distal standoff ends (adjacent the boat) in selected maximum space relationships. The standoffs and treads maximum spaced relationship are the same so that twisting if the steps is prevented during use.

18 Claims, 20 Drawing Sheets

(56) References Cited

U.S. PATENT DOCUMENTS

| | | | | |
|---|---|---|---|---|
| 6,279,681 | B1 * | 8/2001 | Dibelardino | E06C 9/14 182/198 |
| 2004/0031646 | A1 * | 2/2004 | Huang | E06C 1/525 182/198 |
| 2015/0337597 | A1 * | 11/2015 | Arnette | E06C 1/34 182/195 |

* cited by examiner

PORTABLE LADDER WITH STANDOFFS

This United States utility patent application claims priority on and the benefit of provisional application 63/171,962 filed Apr. 7, 2021, and also claims priority on and the benefit of pending provisional application 63/226,681 filed Jul. 28, 2021, the entire contents of both being hereby incorporated herein by reference.

BACKGROUND OF THE INVENTION

1. Field of the Invention

The present invention relates to a portable ladder with standoffs.

2. Description of the Related Art

Boating is a common pastime. Many boats have permanent ladders affixed thereto at some point about the perimeter of the boat. One place is near the rear of the boat. This can be dangerous if proper precautions are not used as the motor is generally also located at the back of the boat. Further, there can be instances where it would be desirable to have multiple ladders so that multiple people can enter the boat at the same time. Further, it also can be desirable to not have to reposition the boat so that a person can have access to a ladder.

For these reasons, portable ladders exist. A basic boat ladder can have hooks at the top end that hook over the boat side wall. Another type of ladder can be formed with a rope passing between several horizontal steps. The rope can for a loop at the top, and the top of the loop can be secured to a cleat or other hook. While such devices are indeed portable and usable, they can nevertheless be improved upon.

Thus, there exists a need for a portable ladder with standoffs that solves these and other problems.

SUMMARY OF THE INVENTION

The present invention relates to a portable ladder with standoffs. The ladder has several steps, each having a tread, two elbows and two standoffs. The user uses the treads to ascend the ladder. The standoffs have distal ends that contact the boat for stability. A tread cable assembly secures the ladder to the boat and supports the treads in a selected maximum spaced relationship. Two standoff cable assemblies are also provided. Each standoff cable assembly has sections that supports the distal standoff ends (adjacent the boat) in selected maximum space relationships. The standoffs and treads maximum spaced relationship are the same so that twisting if the steps is prevented during use.

According to one advantage of the present invention, the ladder is both portable and easily storable. The cables are flexible and allow the ladder to be wrapped into a small space when not deployed. Since, the ladders take up little space in the storage position, several can be stored on the boat whereby the boaters can deploy multiple ladders simultaneously if the use of multiple ladders is desired.

According to another advantage of the present invention, the ladder can be secured to any fastening point, such as a hook or cleat, that is present about the perimeter of the boat. The ladder can also be internally looped within itself after being wrapped around a post or railing (passing the remainder of the ladder through the hanger loop, which is wrapped around a post or rail). This makes the ladder useful around the entire boat.

According to a further advantage of the present invention, the standoffs contact the side of the boat to provide stability to the ladder by having a surface that the ladder can act against.

According to a still further advantage of the present invention, the standoffs have increased length sequentially from the top step on down. This advantageously results in treads that are more generally vertically aligned when pressed against the side of a boat.

According to a still further advantage yet of the present invention, the ladder can have between 2 and 5 (or more) steps.

According to a still further advantage yet of the present invention, the tread cable assembly and two standoff cable assemblies hold steps generally horizontal and in generally parallel planes with respect to each other. This increases the internal stability of the ladder and prevents twisting under load of a person using the ladder.

According to an advantage of an alternative embodiment, the hanger loop can have an eyelet and fastener to selectably break the loop and then reconnect the loop for insertion and removal from an object (such as a handle or cleat).

It is appreciated that while the portable ladder is illustrated in connection with a boat, that the invention can be used with other objects, such as but not limited to, automobiles or campers, and can be used in other environments such as but not limited to household uses.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
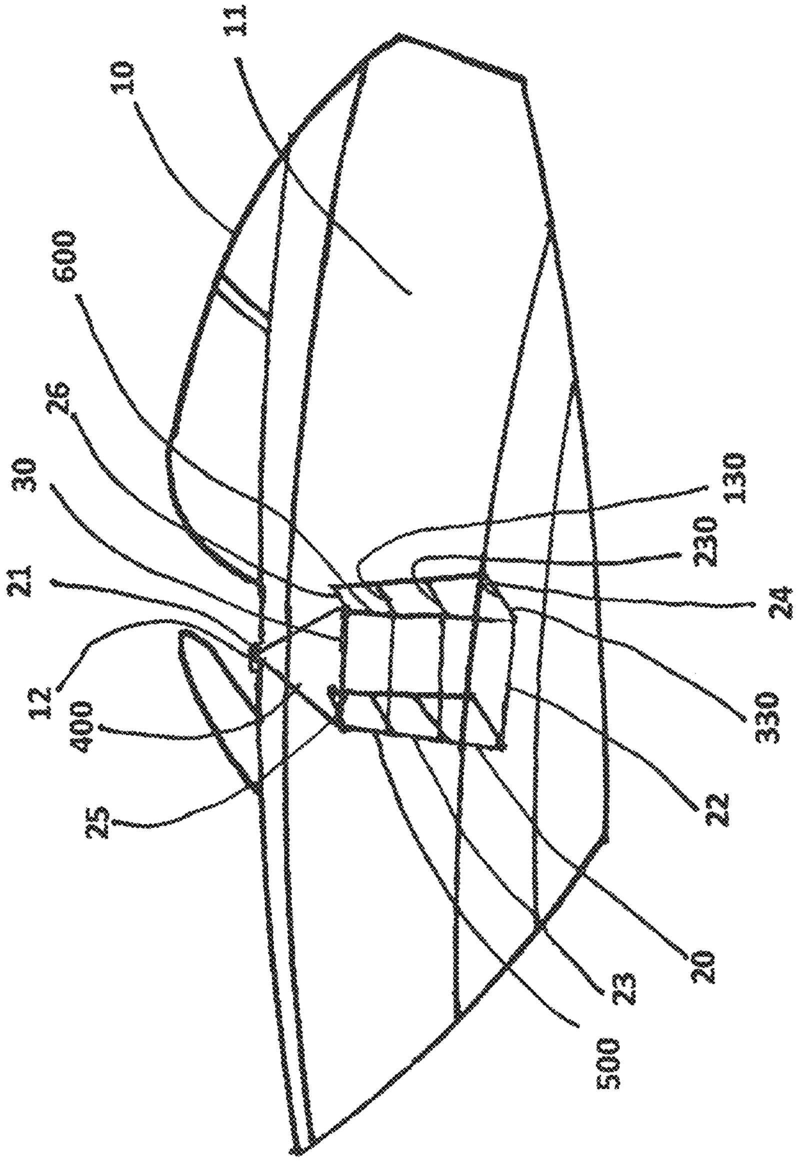
FIG. 1 is a schematic view showing the ladder in operation on the side of a boat.
Figure 2:
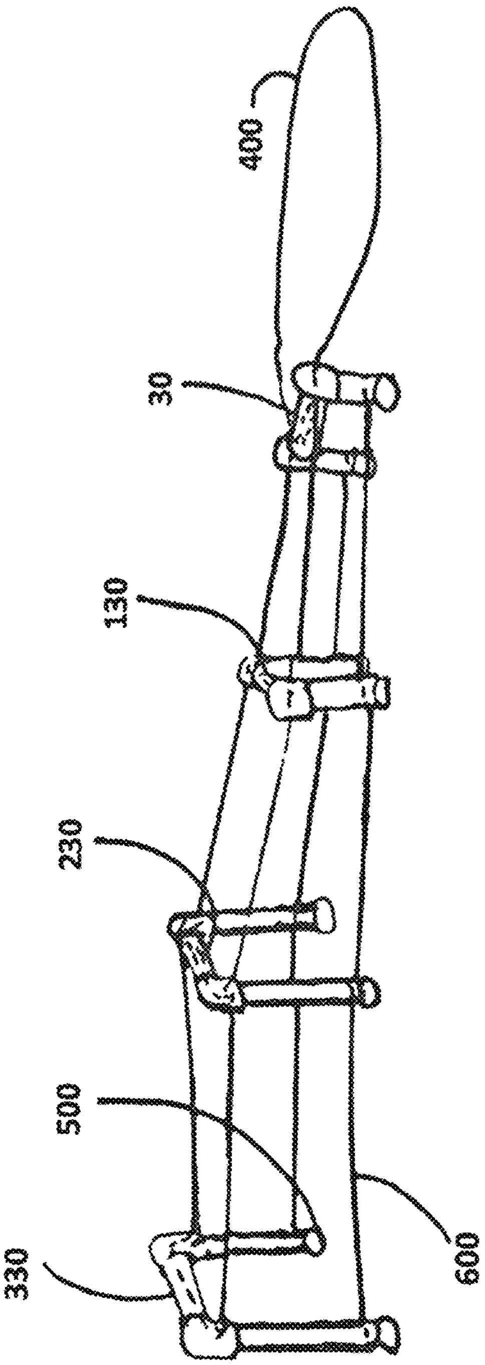
FIG. 2 is a side perspective view of an embodiment of the ladder of the present invention.
Figure 3:
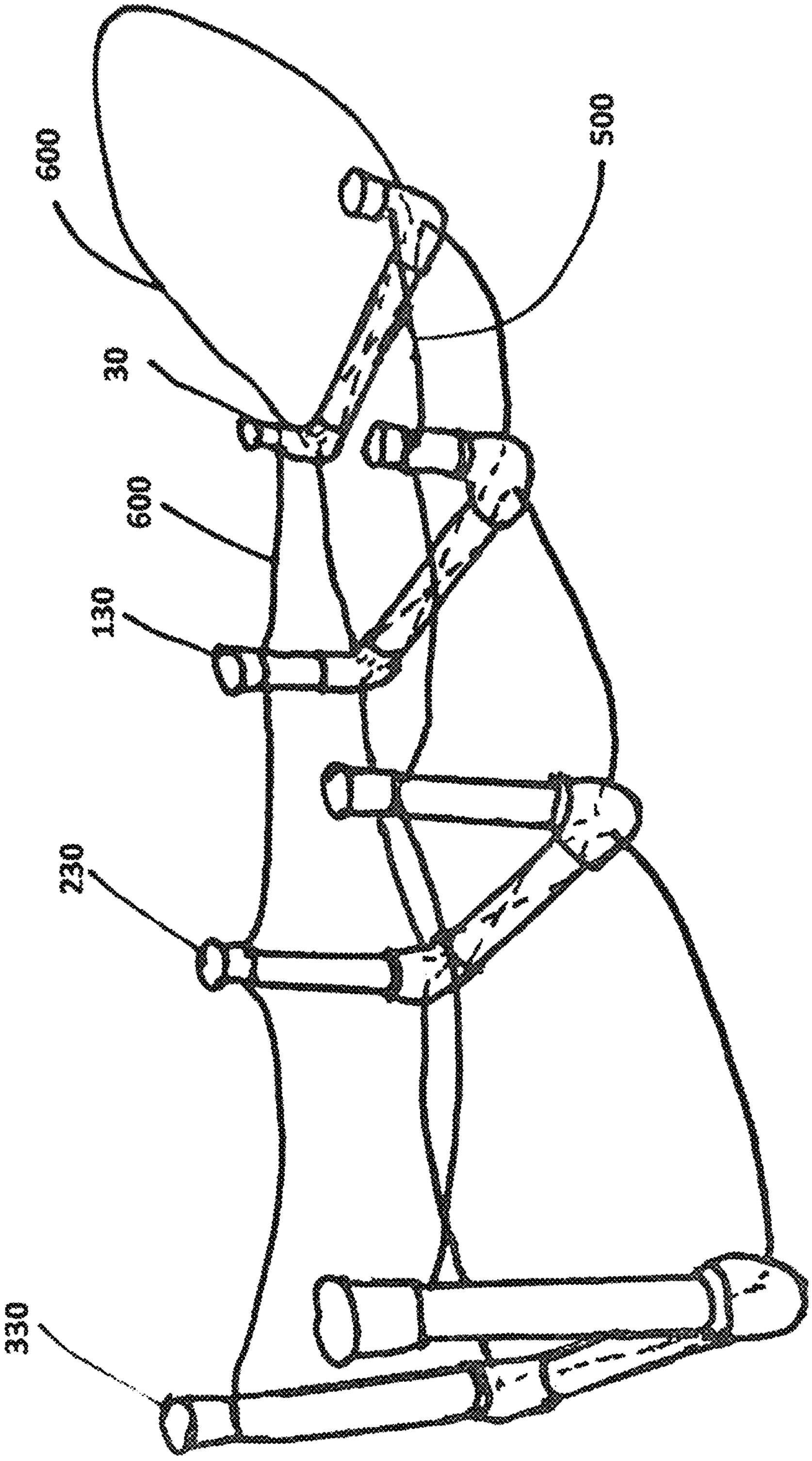
FIG. 3 is a reverse perspective view showing the embodiment illustrated in FIG. 2.
Figure 4:
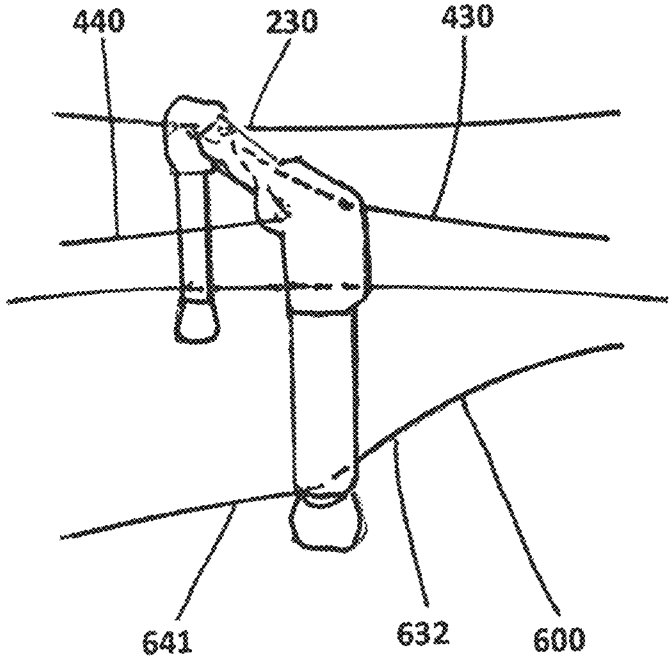
FIG. 4 is a close-up perspective view of a step.
Figure 5:
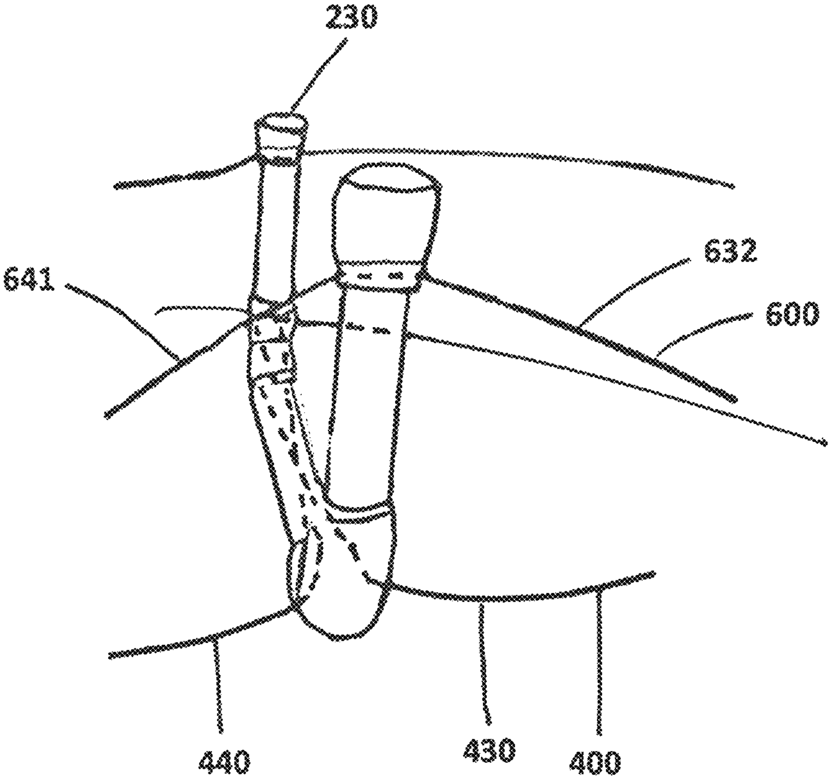
FIG. 5 is a reverse close-up perspective view of the step illustrated in FIG. 4.
Figure 6:
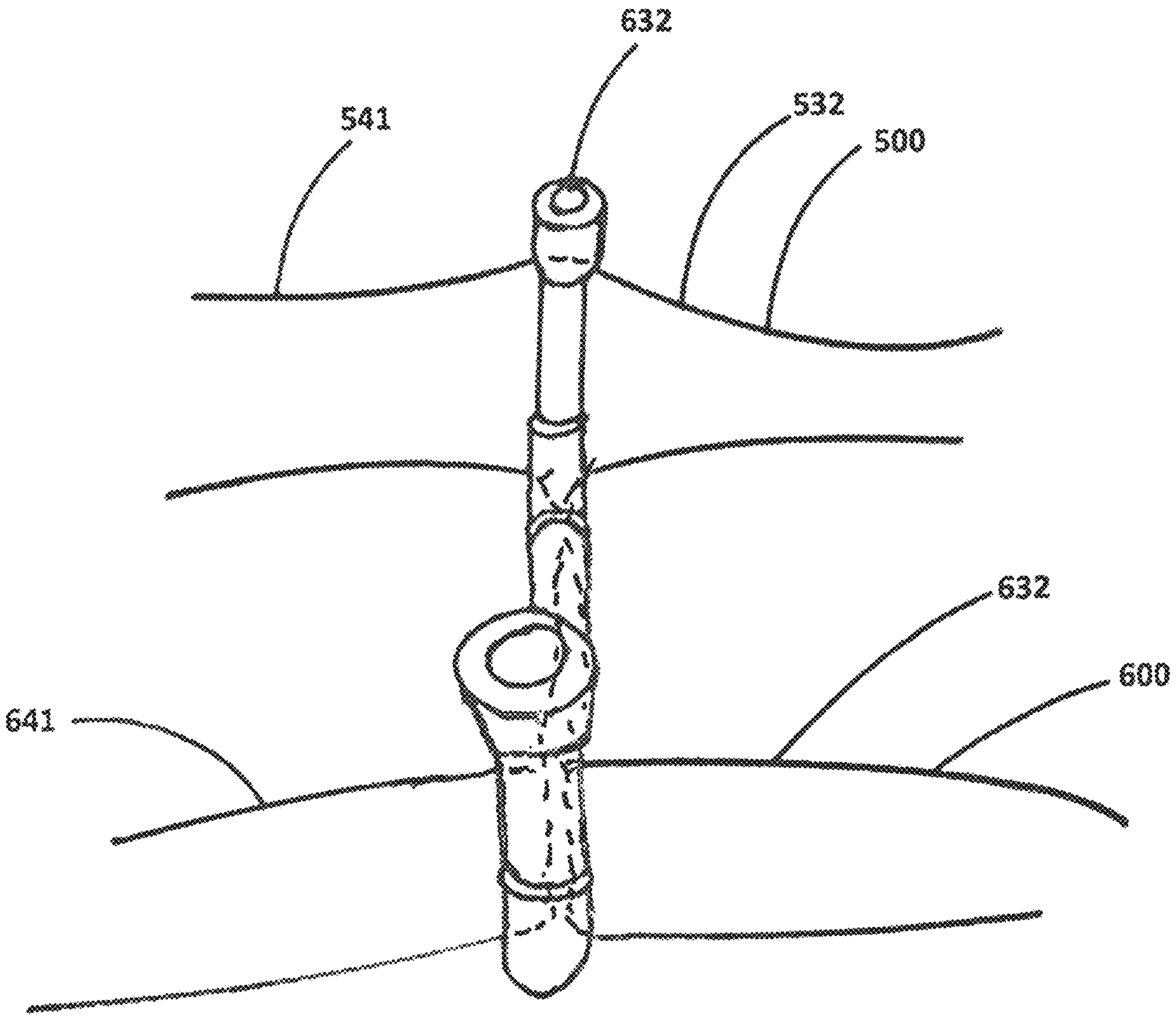
FIG. 6 is a lower perspective view of the step illustrated in FIG. 4.
Figure 7:
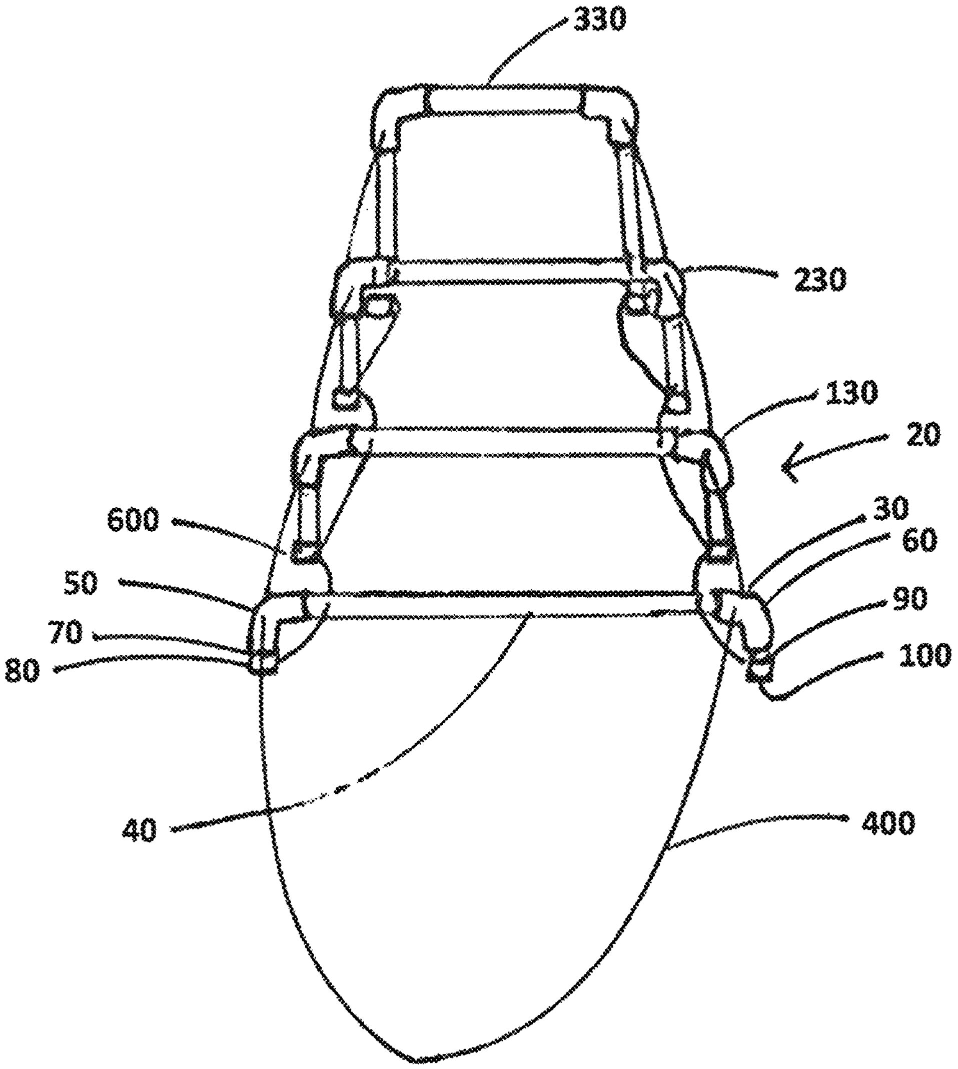
FIG. 7 is a top end perspective view showing the embodiment illustrated in FIG. 2.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

An embodiment of a ladder 20 of the present invention is shown in FIGS. 1-16. The ladder 20 is a portable ladder that can be used with a boat 10 (or with other objects) by allowing a person to climb the ladder 20. The ladder 20 can be secured to a fastener 12 (such as a hook, cleat or pole) positioned around the perimeter of the boat, such as for example on the side 11. The ladder 20 can also be internally looped within itself after being wrapped around a post or railing (passing the remainder of the ladder through the hanger loop, which is wrapped around a post or rail).

The ladder 20 has a top 21, bottom 22, sides 23 and 24, respectively, a front 25 and a back 26. The ladder 20 has a step 30 (and 130, 230 and 330). While four steps are illustrated, it is appreciated that the ladder could have between two and five (or more) steps without departing from the broad aspects of the present invention depending on the amount of overall ladder height desired. It is anticipated that four steps will be useful in most applications. The ladder 20 also has a tread cable assembly 400 and two standoff cable assemblies 500 and 600, respectively. Each of the components is illustrated below.

Step 30 has a tread 40, elbow 50, elbow 60, standoff 70 and standoff 90. The tread 40 is preferably a hollow tube with an interior 41. Tread 40 also has two ends 42 and 43.

Elbow 50 has a first section 51 with two holes 52 and 53, and a second section 54. The elbow is hollow and has an inside diameter sized to mate with the outside of the tread. In this regard, the first section 51 can be secured to the end 42 of the tread 40.

Elbow 60 has a first section 61 with two holes 62 and 63, and a second section 64. The elbow is hollow and has an inside diameter sized to mate with the outside of the tread. In this regard, the first section 61 can be secured to the end 43 of the tread 40.

Standoff 70 has a hollow interior 71. Standoff 70 also has a first end 72 and a second end 73. The second end 73 is the distal end (from tread 40 when assembled) and has two diametrically opposed slots 74 and 75, respectively, formed therethrough. A cap 80 can be slid onto the end 73 of the standoff 70, covering most of the slots 74 and 75, except for interior ends of the slots of a depth equal to the diameter of a cable (described below). The cap 80 is preferably a high friction cap made of plastic or rubber that will not easily slide against the side 11 of the boat 10.

Standoff 90 has a hollow interior 91. Standoff 90 also has a first end 92 and a second end 93. The second end 93 is the distal end (from tread 40 when assembled) and has two diametrically opposed slots 94 and 95, respectively, formed therethrough. A cap 100 can be slid onto the end 93 of the standoff 90, covering most of the slots 94 and 95, except for interior ends of the slots of a depth equal to the diameter of a cable (described below). The cap 100 is preferably a high friction cap made of plastic or rubber that will not easily slide against the side 11 of the boat 10.

The treads, shoulders and standoffs of steps 30, 130, 230 and 330 are preferably made of plastic, but could be made of other strong materials such as metal without departing from the broad aspects of the present invention.

The steps 30, 130, 230 and 330 preferably have a similar tread width and length dimensions. The steps can differ in standoff height. Preferably, the top step has the shortest standoff height, and the bottom step has the tallest standoff height. This allows the ladder to have more vertically aligned treads when used with boats having inwardly angled boat sides.

Figure 10:
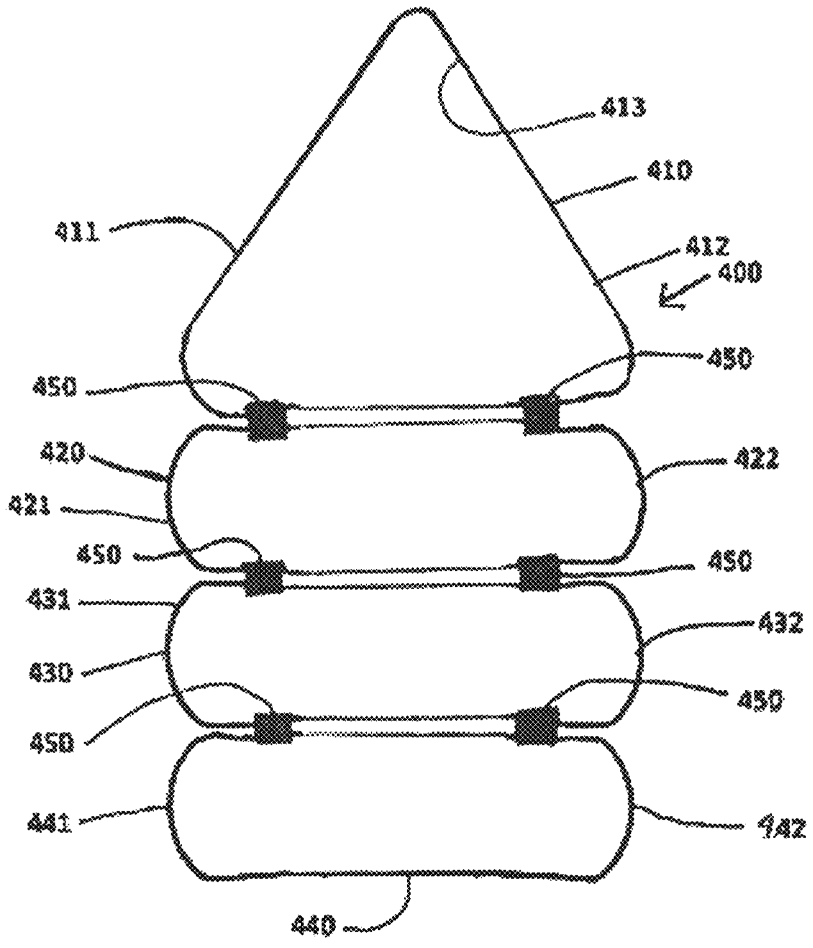
FIG. 10 is a schematic view showing the tread cable assembly comprised of a plurality of loops.

Turning now to FIG. 10, it is seen that an embodiment of the tread cable assembly 400 is shown. The tread cable assembly 400 has a hanger loop 410. The hanger loop has sides 411 and 412, and has a top 413. The tread cable assembly 400 further has a step loop 420 with sides 421 and 422. Step loop 430 with sides 431 and 432, and step loop 440 with sides 441 and 442 are also provided. In this illustrated embodiment, four total loops are illustrated and useful with a ladder having four steps. More or fewer step loops would be used with ladders having more or fewer steps, respectively. Crimps 450 are used to secure loops together.

Figure 8:
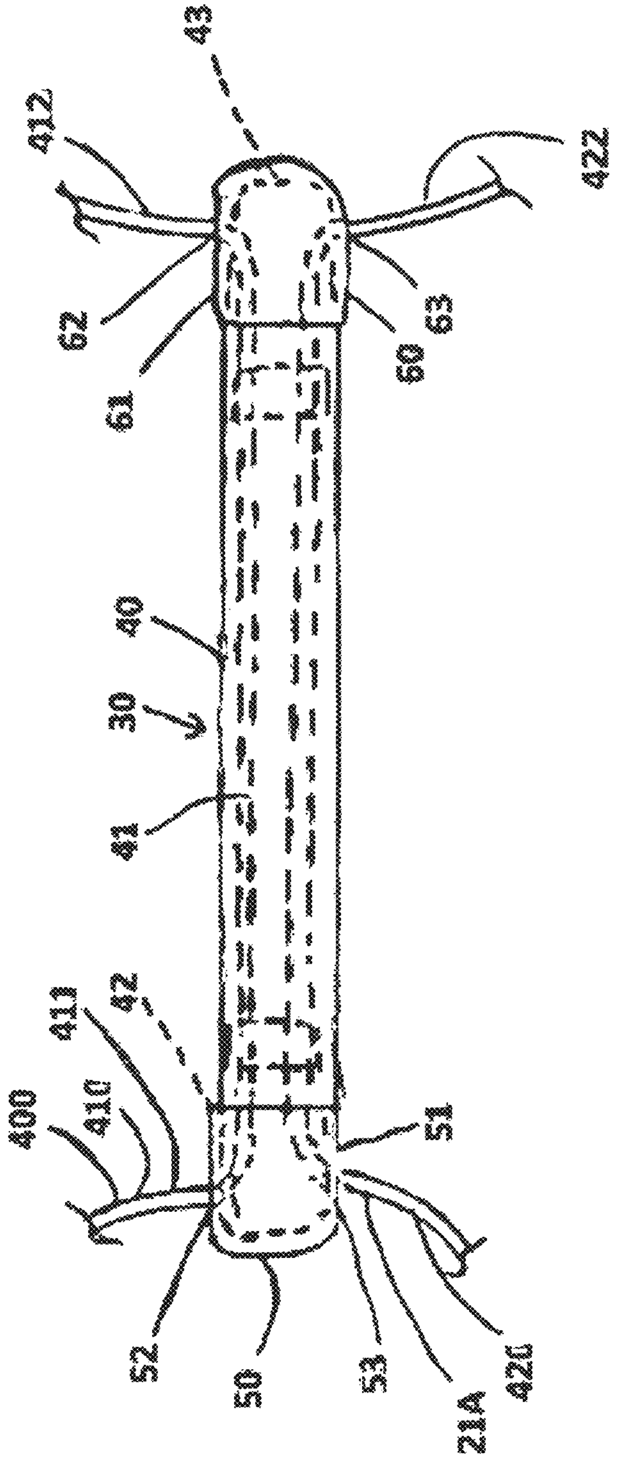
FIG. 8 is a schematic view showing two loops and a tread and elbows.
Figure 8A:
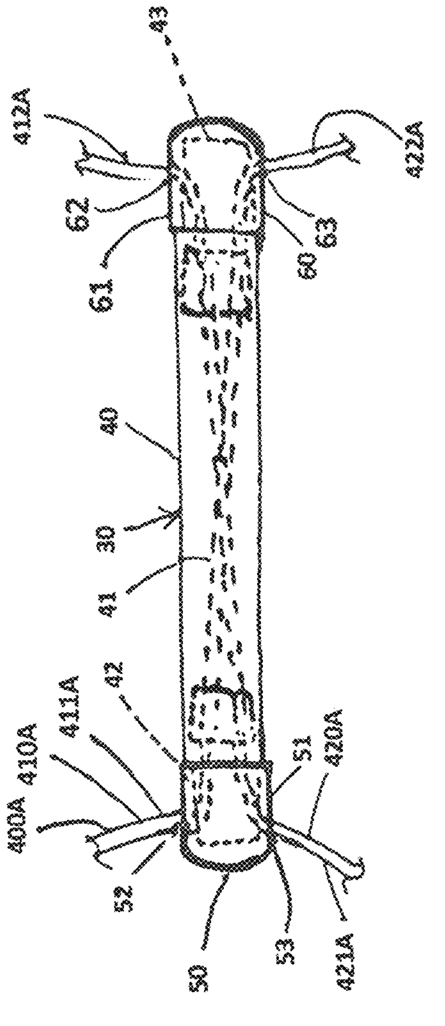
FIG. 8A is a schematic view showing a single cable crisscrossing within a tread.
Figure 9:
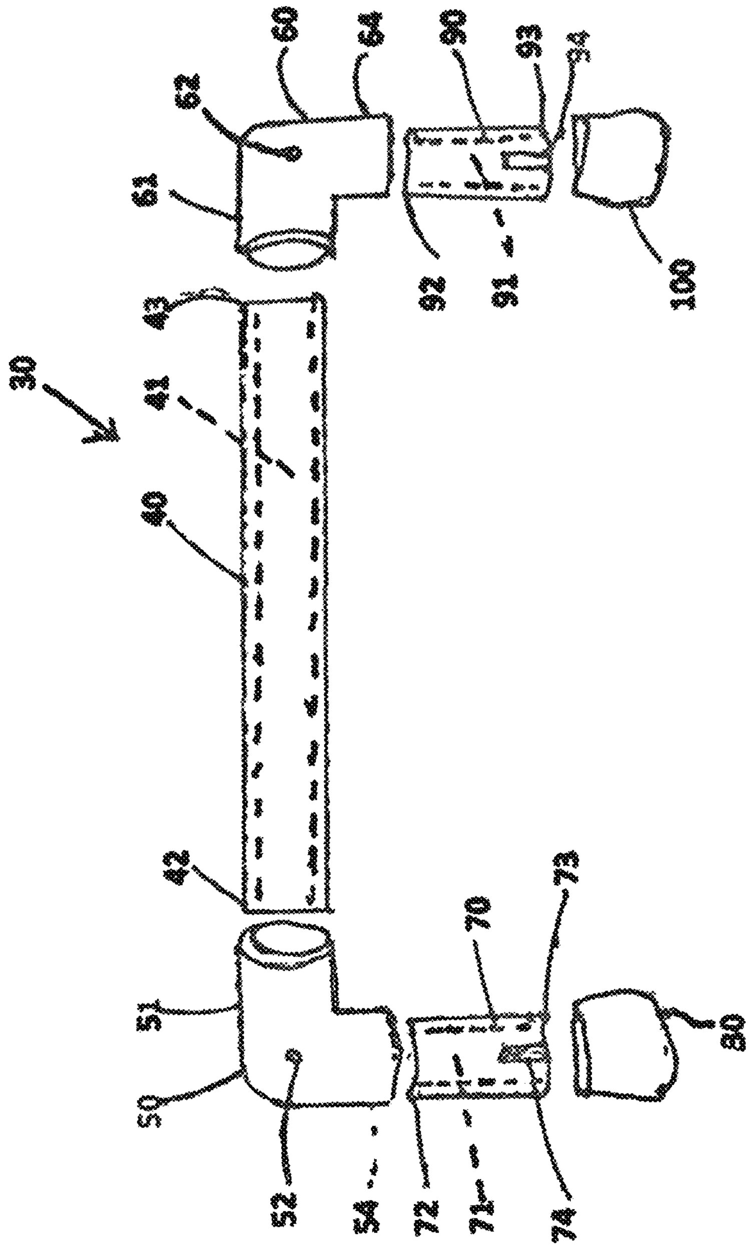
FIG. 9 is an exploded view of a step.
Figure 10A:
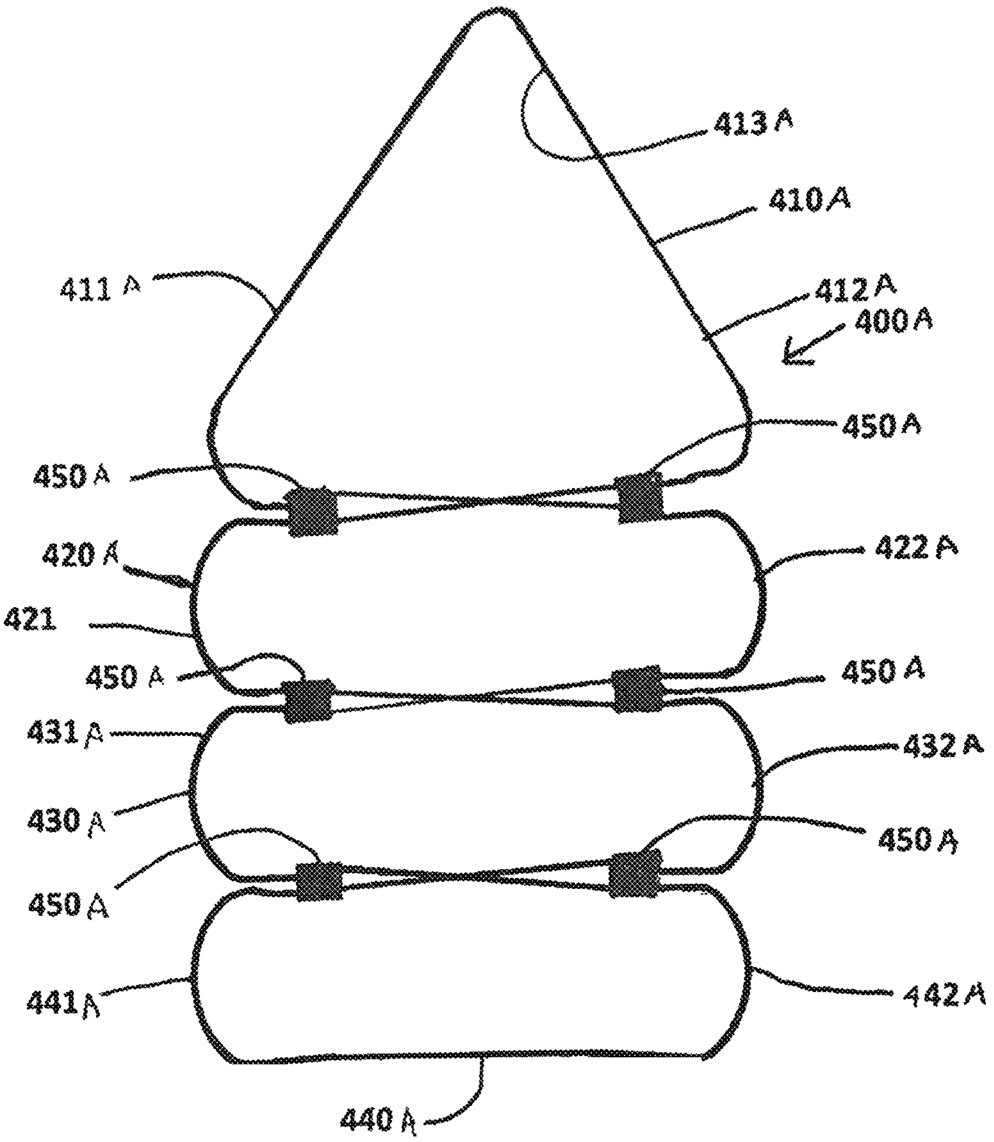
FIG. 10A is a schematic view showing a tread cable assembly with a single continuous cable.

It is appreciated that while loops are illustrated as being formed from multiple cables in FIG. 10, that an embodiment with a single continuous cable or wire could be used to form the tread cable assembly 400A as shown in FIG. 10A. The tread cable assembly 400A has a hanger loop 410A. The hanger loop has sides 411A and 412A, and has a top 413A. The tread cable assembly 400A further has a step loop 420A with sides 421A and 422A. Step loop 430A with sides 431A and 432A, and step loop 440A with sides 441A and 442A are also provided. Crimps 450A are used to secure the loops together. In this illustrated embodiment, four total loops are illustrated and useful with a ladder having four steps. More or fewer step loops would be used with ladders having more or fewer steps, respectively. In this regard, the cable would crisscross or cross-over within each tread 40 so that two sections of the cable would alternatively pass to opposite sides of each tread. This is illustrated in FIG. 8A.

Figure 15:
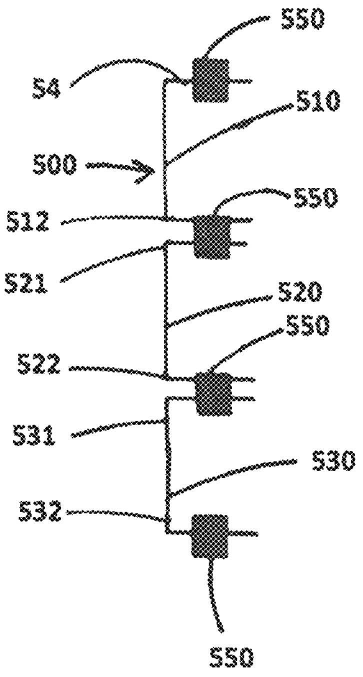
FIG. 15 is a schematic view of a standoff cable assembly.

Turning now to FIG. 15, it is seen that a standoff cable assembly 500 is shown. The standoff cable assembly 500 has three sections 510, 520 and 530, respectively. Section 510 has ends 511 and 512. Section 520 has ends 521 and 522. Section 530 has ends 531 and 532. In this illustrated embodiment, three sections are illustrated and useful with a ladder having four steps. More or fewer sections would be used with ladders having more or fewer steps, respectively. Sections are connected together with crimps 550. End 511 has a crimp. Ends 512 and 521 are fastened together with a crimp. Ends 522 and 531 are fastened together with a crimp. End 532 has a crimp 550.

Figure 16:
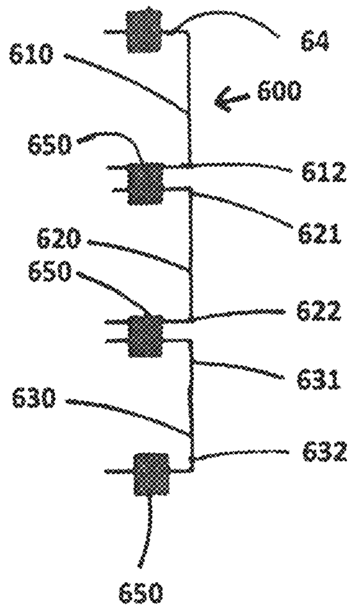
FIG. 16 is a schematic view of a second standoff cable assembly.

Turning now to FIG. 16, it is seen that a standoff cable assembly 600 is shown. The standoff cable assembly 600 has three sections 610, 620 and 630, respectively. Section 610 has ends 611 and 612. Section 620 has ends 621 and 622. Section 630 has ends 631 and 632. In this illustrated embodiment, three sections are illustrated and useful with a ladder having four steps. More or fewer sections would be used with ladders having more or fewer steps, respectively. Sections are connected together with crimps 650. End 611 has a crimp. Ends 612 and 621 are fastened together with a crimp. Ends 622 and 631 are fastened together with a crimp. End 632 has a crimp 650.

The loops of the tread cable assembly 400, standoff cable assembly 500 and standoff cable assembly 600 are preferably made of a metal cable coated with plastic. However, they could be made from plastic or other strong materials without departing from the broad aspects of the present invention.

Figure 11:
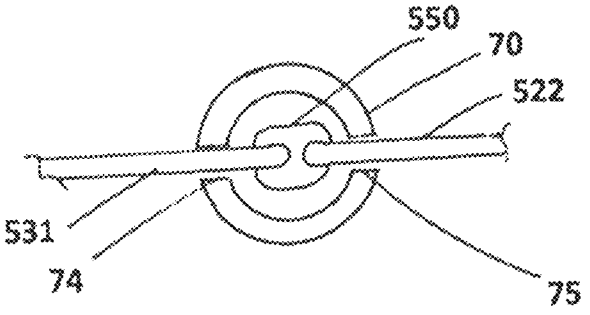
FIG. 11 is an end view showing two sections of the standoff cable assembly and a standoff end.
Figure 12:
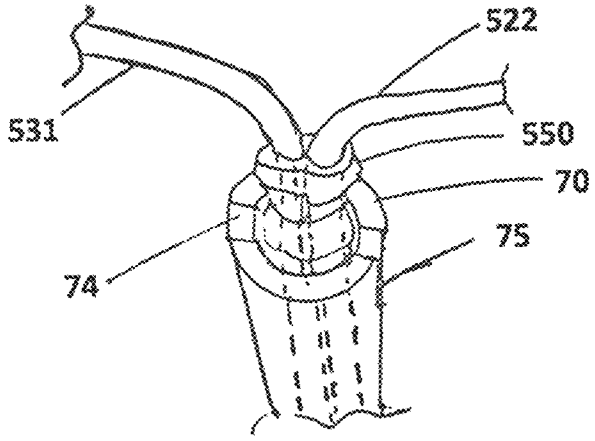
FIG. 12 is similar to FIG. 11 but shows a partial exploded view thereof.
Figure 13:
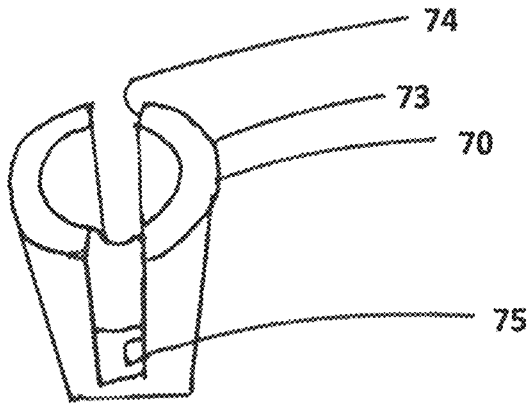
FIG. 13 is an isolation end view of a standoff end.
Figure 14:
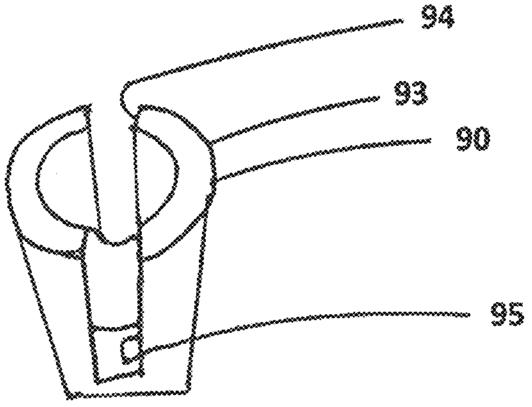
FIG. 14 is an isolation end view of the second standoff end.

Looking at FIGS. 11 and 12, it is seen how the standoff cable assembly 500 is received in the end of a standoff. The crimp 550 is received within the hollow end of the standoff, for example of step 230. Ends 522 and 531 extend through the slot. The crimp cannot pass through the slots and accordingly acts as a position stop of the standoff relative to the standoff cable assembly.

Standoff cable assembly 600 is similarly received with in the distal end of a standoff.

Crimps 450 in the tread cable assembly also act as position stops of the assembly relative to the steps, as the crimps cannot pass through the elbow holes.

The elbows 50 and 60 can be cemented onto the tread 40 or otherwise permanently bonded thereto. Standoff 70 can similarly be bonded to the elbow and standoff 90 can be bonded to elbow 60. The cap 80 is preferably bonded to end 73 of the standoff 70. The cap 100 is preferably bonded to the end 93 of the standoff 90.

In use, a person hangs the ladder 20 from a cleat 12 or other hanger and allows the ladder to drop. The ladder can also be internally looped within itself after being wrapped around a post or railing (passing the remainder of the ladder through the hanger loop, which is wrapped around a post or rail). A person in the water can place their foot on the lowest step 330. The weight of the person will cause the standoffs to engage the side 11 of the boat and the ladder will stabilize. The standoffs will prevent external twisting of the ladder against the boat 10. The crimps do not allow the ladder 20 to internally twist as weight of the person using the ladder shifts.

Figure 17:
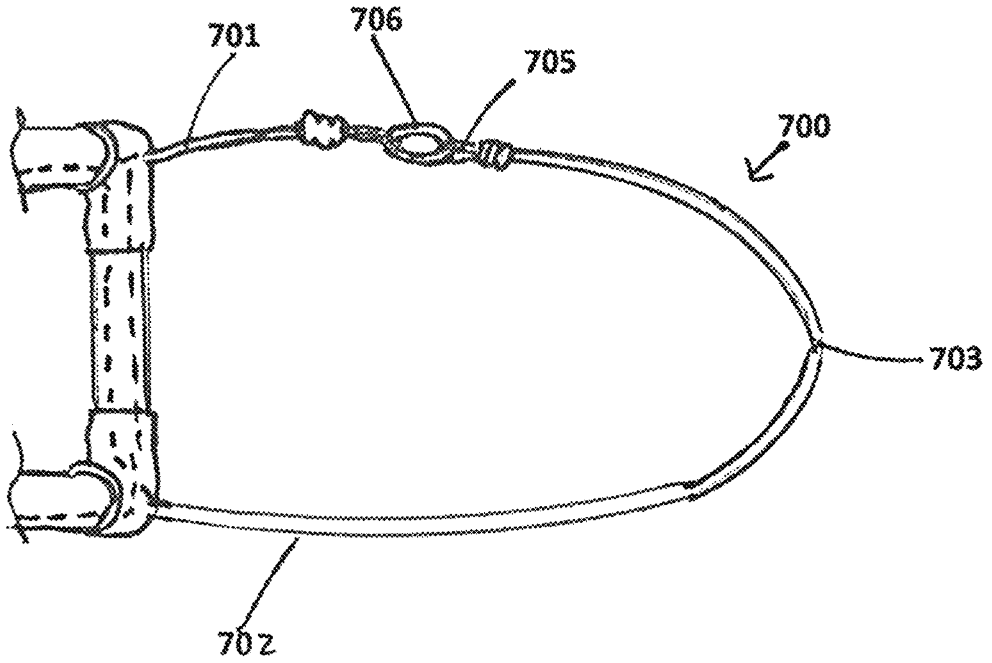
FIG. 17 is a view of alternative embodiment showing an alternative hanger loop.
Figure 18:
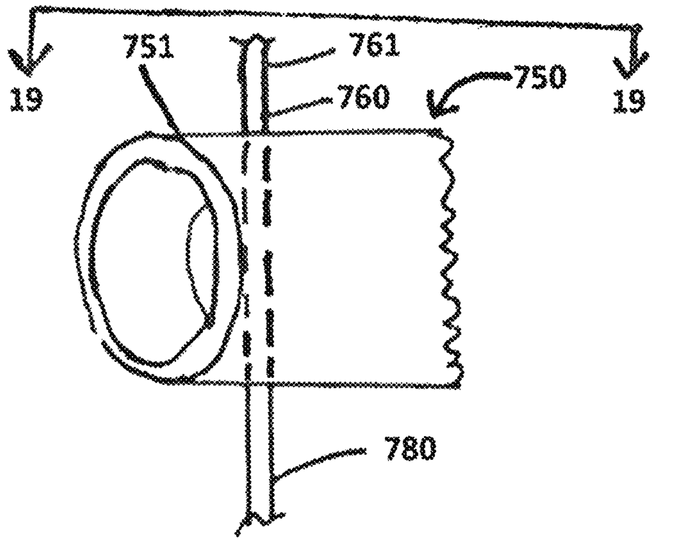
FIG. 18 is a close-up perspective view of an end of a standoff.
Figure 19:
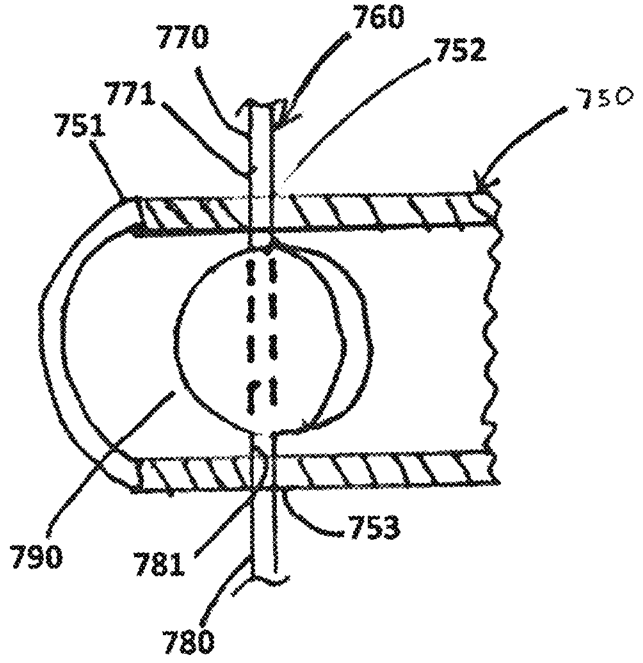
FIG. 19 is a cross-sectional view taken along line 19-19 in FIG. 18.
Figure 20:
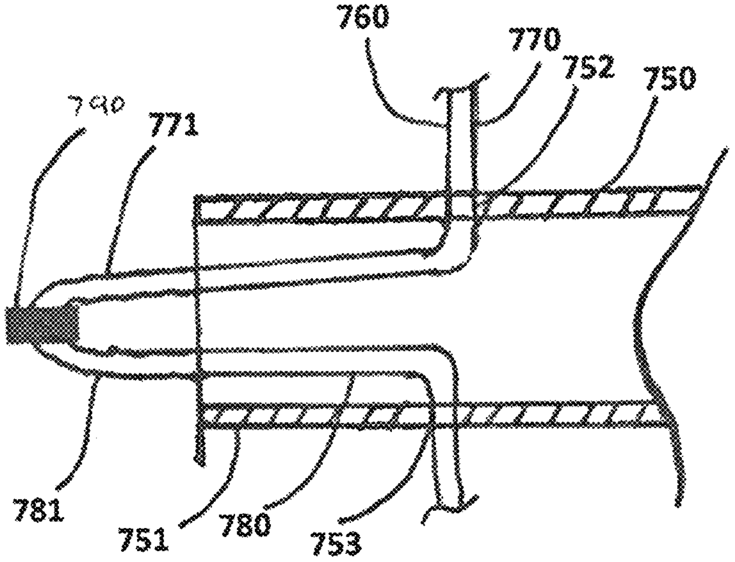
FIG. 20 is similar to FIG. 19 but shows a cable extended from a standoff end and a cable stop in place upon the cable.
Figure 21:
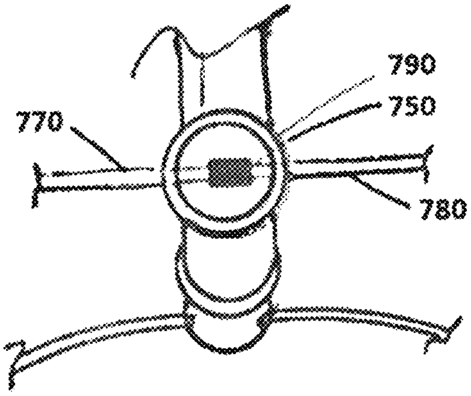
FIG. 21 is an end view showing the stand off embodiment of FIG. 18.
Figure 22:
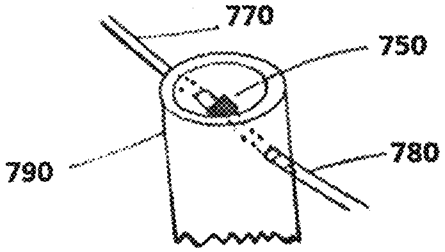
FIG. 22 is an upper perspective view of the embodiment shown in FIG. 18.

Turning now to FIG. 17, it is seen that an alternative hanger loop 700 is illustrated. The loop 700 has sides 701 and 702, and a top 703. The loop has a break with an eyelet 705 on one side of the break and a fastener 706 on the other side of the break. While a ring fastener with a spring-loaded prong is illustrated for connecting to the eyelet, it is appreciated that alternative fasteners (such as mating screw fasteners, quick connect fasteners or other fasteners) could be used without departing from the broad aspects of the present invention allowing the hanger loop 700 to be opened to secure to objects such as handles, cleats or other objects.

Turning now to FIGS. 18-22, it is seen that an alternative embodiment is provided for a standoff and standoff cables. A standoff 750 having and end 751 is provided. The standoff end 751 has two holes 752 and 753 therethrough. Each hole 752 and 553 can be enlarged at the side closer to end 751 on the interior of the standoff 750. A standoff cable 760 is shown. The cable can be a single cable that is sectioned into sections 770 and 780 (and however many sections are necessary to accommodate the desired number of steps). Section 770 has a lower end 771 and section 780 has upper end 781. The sections 770 and 780 are separated with a cable stop 790. The cable 760 can be moved through hole 752 and the end of the cable out the end 751 of the standoff 750. The cable stop 790 can be positioned and fixed to the cable, for example by crimping, and then the cable 760 can be inserted through hole 753. It is seen how the enlarged holes facilitate the cable being extended from the end of the standoff and then inserted through the second hole. The cable 760 is then pulled tight to move the cable stop 790 into the interior of the standoff 750. The standoff is then prevented from sliding down the cable or wire during use by the cable stop.

Figure 23:
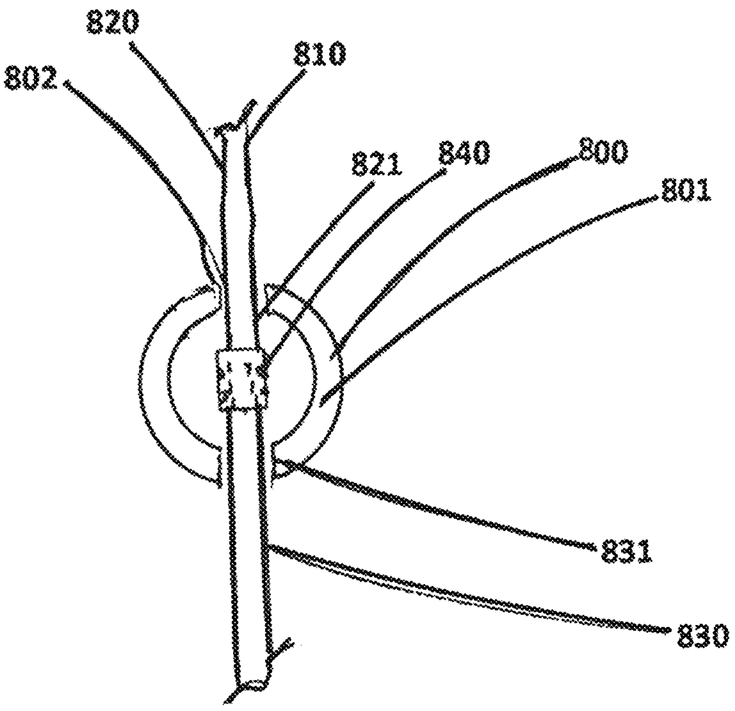
FIG. 23 is a view of a standoff and a portion of a standoff cable assembly.

Turning now to FIG. 23, it is seen that an alternative embodiment is provided for a standoff 800 and standoff cables 810. A standoff 800 having and end 801 is provided. The standoff end 801 has two slots 802 and 803 therethrough. A standoff cable 810 is shown. The cable can be a single cable that is sectioned into sections 820 and 830 (and however many sections are necessary to accommodate the desired number of steps). Section 820 has a lower end 821 and section 830 has upper end 881. The sections 820 and 830 are separated with a cable stop 840. The cable stop 840 can be positioned and fixed to the cable 810, for example by crimping, and then the cable 810 can be inserted into slots 802 and 803. A cap can be used to secure the cable in the slots. 753. The standoff is prevented from sliding down the cable or wire during use by the cable stop, as the cable stop cannot pass perpendicularly through the slots.

It is appreciated that this alternative manufacturing technique can be used for both standoff cable assemblies. In this regard, each standoff cable assembly can be made from a single continuous cable or wire, wherein the cable stops set the spacing between the respective standoffs.

Thus, it is apparent that there has been provided, in accordance with the invention, a portable ladder with standoffs that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A portable ladder comprising:

a first step comprising a first step tread, a first step first standoff and a first step second standoff, the first step tread having a first step tread first end and a first step tread second end;

a second step comprising a second step tread, a second step first standoff and a second step second standoff;

a tread cable assembly comprising a hanger loop and a step loop;

a first standoff cable assembly; and a second standoff cable assembly, wherein said first standoff cable assembly and said second standoff cable assembly maintain said first step and said second step in a selected orientation relative to each other, wherein the hanger loop is a single loop that interfaces with the first step tread first end and the first step tread second end, wherein the tread cable assembly is independent of the first standoff cable assembly and the second standoff cable assembly, wherein the first standoff cable assembly is connected to the first step first standoff and the second step first standoff, and wherein the second standoff cable assembly is connected to the first step second standoff and the second step second standoff.

2. The portable ladder of claim 1 wherein said first step further comprises a first elbow and a second elbow.

3. The portable ladder of claim 2 wherein:
said first elbow comprises a first elbow first hole and a first elbow second hole;
said second elbow comprises a second elbow first hole and a second elbow second hole; and
said tread cable assembly passes through said first elbow first hole, said first elbow second hole, said second elbow first hole and said second elbow second hole.

4. The portable ladder of claim 1 wherein:
said first step tread is parallel to said second step tread.

5. The portable ladder of claim 4, wherein:
said second step first standoff is longer than said first step first standoff.

6. The portable ladder of claim 5 further comprising a third step and wherein said tread cable assembly comprises a second step loop.

7. The portable ladder of claim 4, wherein said step loop passes through a first step tread interior and a second step tread interior.

8. The portable ladder of claim 1, wherein said first standoff cable assembly comprises a cable and a cable stop.

9. The portable ladder of claim 8, wherein said first standoff cable assembly has a distal end comprising a first standoff first hole and a first standoff second hole, said cable stop being within said first standoff and said cable passing through said first standoff first hole and said first standoff second hole.

10. The portable ladder of claim 1 wherein the thread cable assembly is comprised of a single piece of material.

11. The portable ladder of claim 1 wherein the first tread cable assembly does not extend above the first step first standoff.

12. A portable ladder comprising:
a first step;
a second step;
a third step;
a tread cable assembly comprising a hanger loop, a first step loop and a second step loop;
a first standoff cable assembly; and
a second standoff cable assembly,
wherein:
the hanger loop is a single loop connected to the first step;
the first step loop interconnects the first step and the second step;
the second step loop interconnects the second step and the third step;
the first standoff cable assembly interconnects the first step, the second step and the third step, and
the second standoff cable assembly interconnects the first step, the second step and the third step,
wherein the first standoff cable assembly and the second standoff cable assembly are independent of the tread cable assembly, and
wherein said tread cable assembly, said first standoff cable assembly and said second standoff cable assembly hold said first step and said second step in a selected spaced relationship.

13. The portable ladder of claim 12 wherein said selected spaced relationship is parallel.

14. The portable ladder of claim 12, wherein:
said first step comprises a first step tread, a first step first standoff, and a first step second standoff; and
said second step comprises a second step tread, a second step first standoff, and a second step second standoff.

15. The portable ladder of claim 14, wherein said step loop passes through a first step tread interior and a second step tread interior.

16. The portable ladder of claim 15, wherein:
said first step further comprises a first elbow and a second elbow;
said first elbow comprises a first elbow first hole and a first elbow second hole;
said second elbow comprises a second elbow first hole and a second elbow second hole; and
said tread cable assembly passes through said first elbow first hole, said first elbow second hole, said second elbow first hole and said second elbow second hole.

17. The portable ladder of claim 14, wherein said second tread first standoff is longer than said first tread first standoff.

18. The portable ladder of claim 12 wherein the thread cable assembly is comprised of a single piece of material.

* * * * *